US012524383B1

(12) United States Patent
Ganesan et al.

(10) Patent No.: US 12,524,383 B1
(45) Date of Patent: Jan. 13, 2026

(54) SYSTEMS AND METHODS FOR MANAGING A PLURALITY OF DATA OBJECTS IN A BITEMPORAL MANNER

(71) Applicant: People Center, INC., San Francisco, CA (US)

(72) Inventors: Sriram Ganesan, Fremont, CA (US); Jeevan Shankar, Sunnyvale, CA (US)

(73) Assignee: People Center, Inc., San Francisco, CA (US)

( * ) Notice: Subject to any disclaimer, the term of this patent is extended or adjusted under 35 U.S.C. 154(b) by 0 days.

(21) Appl. No.: 18/947,579

(22) Filed: Nov. 14, 2024

(51) Int. Cl.
*G06F 16/00* (2019.01)
*G06F 16/21* (2019.01)

(52) U.S. Cl.
CPC .................................. *G06F 16/219* (2019.01)

(58) Field of Classification Search
CPC .................................................... G06F 16/219
USPC .......................................................... 707/736
See application file for complete search history.

(56) References Cited

U.S. PATENT DOCUMENTS

2023/0117135 A1* 4/2023 Quigley ............. G06Q 20/3678 705/65
2023/0244692 A1* 8/2023 Eltsufin ..................... G06F 9/54 707/618

* cited by examiner

*Primary Examiner* — Chelcie L Daye
(74) *Attorney, Agent, or Firm* — Dority & Manning, P.A.

(57) ABSTRACT

Systems and methods for managing a plurality of data objects in a bitemporal manner are disclosed. The system includes one or more processors and one or more non-transitory computer-readable media that collectively store instructions that cause the computing system to perform operations, the operations comprising: maintaining a first set of data objects comprising one or more values corresponding to one or more data fields; receiving one or more modifications associated with the one or more values; generating token data as function of each modification of the one or more modifications; generating one or more digital tokens as a function of the token data; modifying the one or more values as a function of the one or more modifications; and constructing a second set of data objects as a function of the modified one or more values.

20 Claims, 5 Drawing Sheets

SYSTEMS AND METHODS FOR MANAGING A PLURALITY OF DATA OBJECTS IN A BITEMPORAL MANNER

FIELD

The present disclosure relates generally to systems and methods for managing a plurality of data objects in a bitemporal manner.

BACKGROUND

Tracking and managing the various versions of data objects within a system presents several significant technical challenges. One primary challenge is version control. Each data object may undergo multiple revisions, and the system must maintain a clear and accurate history of these changes. Current systems struggle to capture each modification to the data object, store it efficiently, and provide users with the ability to access, compare, and revert to previous versions as needed.

Another technical challenge associated with managing the various versions of data objects is storage management. Storing numerous versions of data objects can lead to substantial storage requirements. The current systems struggle to balance between retaining sufficient historical data for auditing and compliance purposes while managing storage space effectively.

Accordingly, improved systems and methods for managing a plurality of data objects are desired in the art.

BRIEF DESCRIPTION

Aspects and advantages of the invention in accordance with the present disclosure will be set forth in part in the following description, or may be obvious from the description, or may be learned through practice of the technology.

In accordance with one embodiment, a system for managing a plurality of data objects in a bitemporal manner is provided. The system includes one or more processors and one or more non-transitory computer-readable media that collectively store instructions that, when executed by the one or more processors, cause the computing system to perform operations. The operations include maintaining a first set of data objects comprising one or more values corresponding to one or more data fields. The operations include receiving one or more modifications associated with the one or more values. The operations include generating token data as function of each modification of the one or more modifications, wherein the token data comprises valid data and operational data. The operations include generating one or more digital tokens as a function of the token data, wherein generating the one or more digital tokens comprises storing the one or more digital tokens within a token database. The operations include modifying the one or more values as a function of the one or more modifications. The operations include constructing a second set of data objects as a function of the modified one or more values, wherein constructing the second set of data objects comprises mapping the one or more digital tokens to the modified one or more values. The operations include receiving a user query. The operations include selecting at least one digital token from the token database as a function of the user query. The operations include constructing a third set of data objects as a function of the selection, wherein the third set of data objects comprises an alternate version of the one or more values.

In accordance with another embodiment, a method for managing a plurality of data objects in a bitemporal manner is provided. The method includes maintaining, by a computing system operatively coupled to one or more processors, a first set of data objects comprising one or more values corresponding to one or more data fields. The method includes receiving, by the computing system, one or more modifications associated with the one or more values. The method includes generating, by the computing system, token data as function of each modification of the one or more modifications, wherein the token data comprises valid data and operational data. The method includes generating, by the computing system, one or more digital tokens as a function of the token data, wherein generating the one or more digital tokens comprises storing the one or more digital tokens within a token database. The method includes modifying, by the computing system, the one or more values as a function of the one or more modifications. The method includes constructing, by the computing system, a second set of data objects as a function of the modified one or more values, wherein constructing the second set of data objects comprises mapping the one or more digital tokens to the modified one or more values. The method includes receiving a user query. The method includes selecting at least one digital token from the token database as a function of the user query. The method includes constructing a third set of data objects as a function of the selection, wherein the third set of data objects comprises an alternate version of the one or more values.

In accordance with an additional embodiment, a system for managing a plurality of data objects in a bitemporal manner is provided. The system includes one or more processors and one or more non-transitory computer-readable media that collectively store instructions that, when executed by the one or more processors, cause the computing system to perform operations. The operations include maintaining, for an entity represented in an object graph, a first data object comprising a first plurality of key value pairs, each key value pair comprising a value for a key, and wherein a first set of dates is associated with the first data object, the first set of dates comprises valid view dates for the first data object. The operations include receiving one or more modifications associated with the one or more values of the first data object. The operations include generating a second data object for the entity represented in the graph as a function of the modified one or more values, the second data object comprising a second plurality of key value pairs, at least one of the key value pairs comprising a modified value that has been modified according to the one or more modifications, and wherein a second set of dates is associated with the second data object, the second set of dates comprises second valid view dates for the second data object, the second set of dates being non-overlapping with the first set of dates. The operations include receiving a user query. The operations include constructing a third set of data objects as a function of the user query, wherein the third set of data objects comprises an alternate version of the one or more values.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention, including the best mode of making and using the present systems and methods, directed to one of ordinary skill in the art, is set forth in the specification, which makes reference to the appended figures, in which.

DETAILED DESCRIPTION

Figure 1:
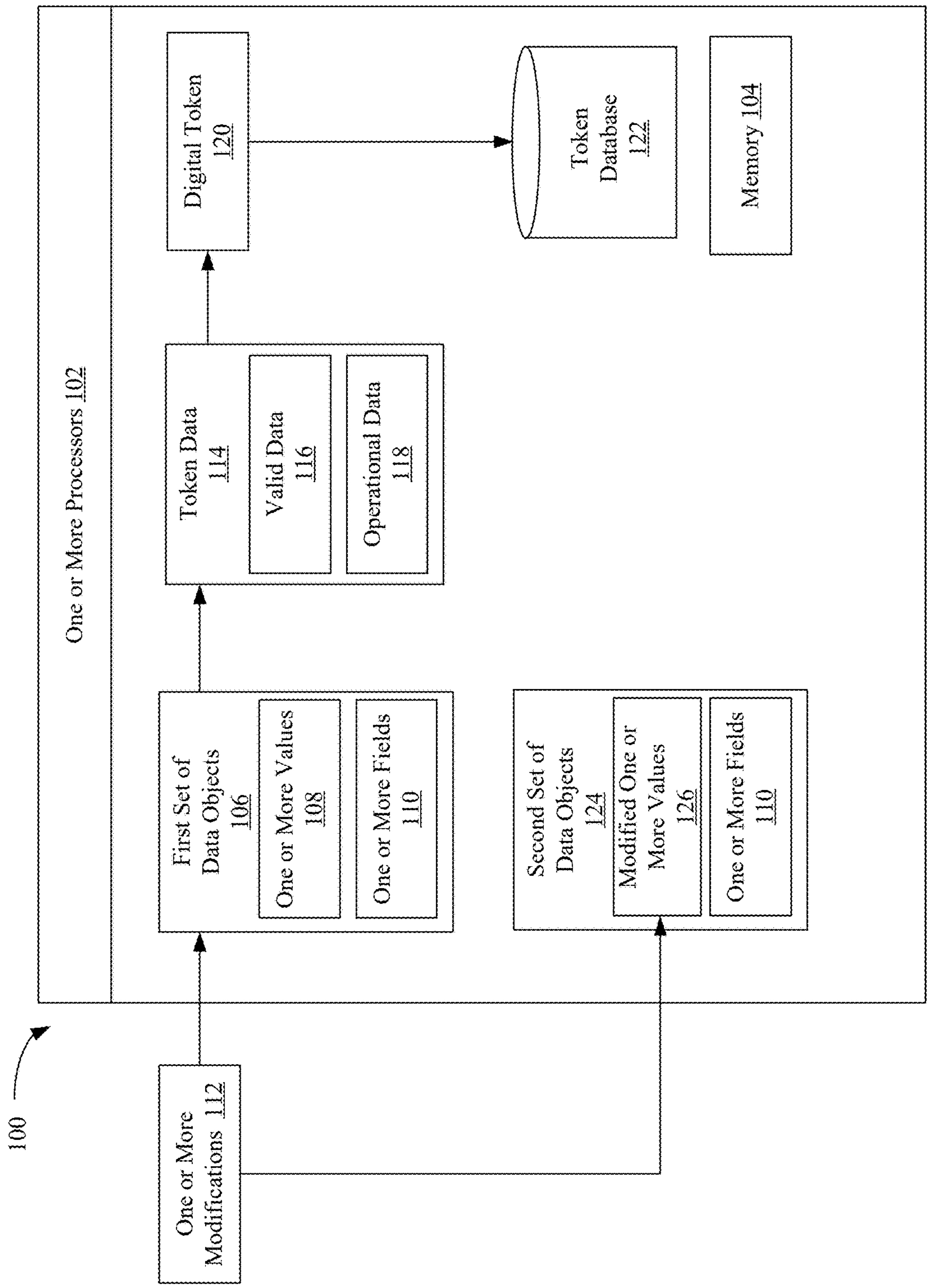
FIG. 1 is a block diagram of an exemplary system for managing a plurality of data objects in a bitemporal manner in accordance with embodiments of the present disclosure.

Generally, the present disclosure is directed to systems and methods for managing a plurality of data objects in a bitemporal manner. Systems and methods disclosed herein may be used to effectively maintain and manage several versions of data objects, track modifications, and maintain historical records of each data object. The system may be used to capture the state of each data object at various points in time, including the past, present, future, and alternate versions of each timeline. This may be done to improve the accuracy with which devices can track the changes to a data object which may enable the system to restore previous versions as necessary or otherwise enable improved understanding or evaluation of changes to the data object over time.

In particular, example aspects of the present disclosure relate to managing bitemporal data objects in a database environment, ensuring data integrity, consistency, and historical traceability. A computing system can be configured to handle data objects that have two temporal dimensions: an operational time when the version of the data object was written to the database, and a valid time when the changes to the data object are considered effective. This bitemporal approach allows users to view the state of the data object at any given historical point and manage future-dated changes effectively.

Another aspect of the present disclosure relates to the immutability and replicability of data objects. For example, the system can operate such that once data is written, it remains unchanged, and past states of the data objects can be recreated. In some implementations, the system can use a linked list structure to manage data objects versions, which allows for efficient rebasing and modifications of past entries without disrupting the integrity of future entries. This structure can be useful in various applications such as, for example, payroll processing, where historical data accuracy and auditability are desirable.

Another example aspect is directed to solutions for avoiding concurrent modifications of bitemporal data objects, which can lead to inconsistencies and potential data corruption. Example solutions proposed herein include implementing a locking mechanism to serialize updates, detecting concurrent modifications and rolling back transactions, and serializing writes based on key constraints.

The proposed technology offers several technical effects and benefits. As one example, the proposed technology provides a framework for managing bitemporal data objects, which involves maintaining records of data changes across two dimensions of time: the operational time when the data was entered into the system, and the valid time when the data becomes effective. This dual-time tracking enables a comprehensive view of data changes over time, facilitating better data management, auditing, and compliance.

Another technical effects of the proposed technology is the enhanced ability to maintain data integrity. By tracking both the operation and valid times, the system ensures that all changes to data are recorded immutably and can be audited with precise temporal accuracy. Moreover, the technology allows for the effective management of historical data. Users can query the state of the data at any given point in the past, not just based on when data was entered, but also based on when it was meant to be effective.

More particularly, in some implementations, a computing system is designed to record and manage a plurality of data objects in a bitemporal manner. This may mean that the system is designed to record and manage the plurality of data objects through two distinct bitemporal dimensions: valid time and operational time. Valid time refers to the period during which data accurately represents real-world facts, while operational time denotes the period during which the data is stored within the system. In some implementations, the system may immutably record this data through the use of digital tokens as discussed in greater detail below.

Systems and methods disclosed herein include maintaining a first set of data objects comprising one or more values corresponding to one or more data fields. As used in the current disclosure, a data object refers to a discrete unit of data that includes one or multiple values across various fields, each of which holds specific information. Each field within a data object may represent a distinct category of information pertinent to the object's purpose or function. For instance, in a customer database, the data object might include fields such as customer name, address, phone number, and email. Each of these fields contains specific values that collectively define a complete record for a particular customer. Data objects are designed to facilitate efficient storage, retrieval, and manipulation of information. They serve as a structured format for organizing data, ensuring that related pieces of information are grouped together in a coherent manner. This structure is beneficial for managing complex datasets, as it allows for systematic access and modification of the data. For example, a data object related to an employee record might include fields for employee ID, job title, department, and salary, all of which are useful for employee management and reporting.

Data objects can exhibit varying levels of complexity based on the specific requirements of the application in which they are used. In an embodiment, a data object may encompass only a few fields with direct values. For example, a basic contact information data object might include fields such as name, phone number, and email address. Each field in this simple object contains a single, discrete piece of data, making the structure easy to understand and manage. As the complexity of the application increases, so too can the complexity of the data objects. More sophisticated data objects can incorporate nested structures, hierarchical relationships, and/or multi-dimensional data representations. This may allow the data objects to capture more detailed and nuanced information. For instance, consider an invoice data object used in an accounting system. This object might include primary fields such as invoice numbers, issue dates, and customer information, but it could also contain nested fields to provide a more comprehensive view.

Data objects that have a nested structure might include sub-fields. For example, this may include sub-fields for itemized charges, where each charge could have one or more fields related to quantity, description, unit price, and total amount. Additionally, the sub-fields may include fields for payment status, including sub-fields for payment date, method, and confirmation number. These nested sub-fields allow for detailed tracking of each charge and payment.

Hierarchical relationships may further increase the complexity of data objects. In some systems, data objects may be organized in a tree-like structure where parent objects contain child objects, each of which may have its own set of sub-objects. This hierarchical approach is useful for representing data with multiple levels of detail. For instance, a project management system might use hierarchical data objects to manage project details, where a top-level project object contains nested tasks, each with its own subtasks and related resources.

Some example systems and methods disclosed herein include receiving one or more modifications associated with the one or more values. As used in the current disclosure, one or more modifications refers to any alteration or adjustment made to the attributes or values within the data object. One or more modifications may include updating, correcting, adding, or deleting specific values and/or fields within the data object.

Modifications may include updating values associated with the data object. This may include changing an existing value within the data object to reflect new or revised information. For example, if a customer's address is updated in their record, the previous address is replaced with the new one. This change may be documented by the token data with a timestamp indicating when the update occurred.

Modifications may include one or more corrections to a value. Corrections may be used to rectify an incorrect or erroneous value. For instance, if a particular record contains an inaccurate amount, the correction can include adjusting this value to the correct figure. The modification may include a recordation of this correction, including details about the error, the corrected value, and the date of the change.

Modifications may include one or more additions to the data object. An addition can include introducing a new value, attribute, or field to the data object. For example, if a customer record is updated to include a new field for a loyalty program membership, this new value is added while preserving the existing attributes. The modification may include a recordation of this additional data and the effective date of the addition.

Modifications may include one or more deletions to the data object. Deletion is a modification that removes an existing value or attribute from a data object. For example, if a product is discontinued, the corresponding value is removed from the inventory record. Although the value is no longer part of the active dataset, the system documents this deletion with an effective date to preserve a historical record of the data object's previous state.

The one or more modifications may additionally include modifications to historical and future values. The one or more modifications can include adjustments that impact the value's state both retrospectively and prospectively. This includes retroactively dated modifications that adjust historical values and future-dated modifications that affect the data object's future state, potentially even before an existing future-dated modification.

Retroactive modifications can include changing values in the data object for periods that precede the current date. For instance, if the data object represents an employee's salary, and it is discovered that the salary was incorrectly recorded for the past year, a retroactive modification would correct the historical salary data to reflect the accurate amounts. This adjustment may be timestamped with multiple dates. This may include a first timestamp reflecting a date that precedes the current date, this date is the effective date of the change. The system may also include a second timestamp that reflects the current date and time in which the change was made. The system ensures that these changes are documented with precise timestamps and annotations to preserve the integrity of the historical data.

Future-dated modifications can include setting or altering values for dates that are beyond the current point in time. For example, if an employee's contract includes a salary increase effective from a future date, the system records this increase as a future-dated modification. This future change can be documented with a timestamp specifying the effective date of the modification, ensuring that the data object reflects the anticipated state once the effective date arrives.

In cases where a future-dated modification occurs prior to an existing future-dated modification within the same data object, the system can manage these overlapping changes carefully. For instance, if an employee's salary was set to increase on Jan. 1, 2025, but a subsequent modification is made to adjust the salary from Dec. 1, 2024, to Jan. 1, 2025, the system can reconcile these modifications. The system can document both changes, with clear timestamps for each modification.

In an embodiment, the one or more modifications may be generated through various channels, either originating from user inputs or automated actions performed by the processor. User-generated modifications may occur when users interact with the system to make changes to the data, such as inputting new information, rectifying errors, or adjusting values based on new data. These user-driven changes may be logged with details including the user's identity, the nature of the modification, and the timestamp of the action.

Conversely, processor-generated modifications arise from automated system operations, such as batch updates, system corrections, or scheduled data adjustments. These modifications are executed based on predefined rules, algorithms, or triggers, and are documented similarly, capturing the specifics of the change, the effective period, and any relevant timestamps. Both types of modifications may be recorded by the token data.

In some implementations, the system operates to generate and maintain a linked list of versions of data objects which result from modifications, which can also be referred to as "commits". Each commit in the linked list can be associated with a tracker that records detailed context and timing of the changes made. This configuration facilitates the dynamic rebasing of future versions of data objects when modifications to past data are required. The tracker can also enhance the system's ability to accurately trace and manage the lineage of each commit. This linked list structure not only maintains the integrity and chronological accuracy of the data object history but also optimizes the process of updating past entries without disrupting the state of future scheduled changes.

In some implementations, systems and methods disclosed herein can generate token data as a function of each modification of the one or more modifications, wherein the token data comprises valid data and operational data. For example, token data can be used to represent a particular commit and/or modifications entered to create a new commit.

As used in the current disclosure, token data refers to the specific set of information used to create digital tokens. Token data may be derived from the modifications applied to values associated with a particular data object. Token data may include information associated with user identifiers, transaction details, temporal information, or specific values pertinent to the system's needs. Token data may include any data located within the data object including its associated values and fields. This may include any data associated with the modifications of the data object including how the data object was modified, who modified the data object, and temporal information associated with the modifications.

In an embodiment, each modification, whether current, historical, or future-dated may be reflected within the token data. The token data may be used to track each version of the data object with timestamps that denote their effective periods, preserving both past and anticipated states.

In an embodiment, token data may include information associated with audit trails that all modifications, including the nature of changes, effective dates, and user actions.

Token data may include data associated with bitemporal concepts associated with the modifications of the values of the data object. For example, token data may include valid data. As used in the current disclosure, valid data refers to the information that accurately represents the state of the data object at any given point in time, based on its effective or valid period. Valid data reflects the current operational status of the object as it appears to end-users. In a bitemporal system, valid data includes a timestamp to indicate its validity within the data object's lifecycle, capturing the period during which the data is deemed accurate and applicable.

In some implementations, the computing system may indemnify valid data through a systematic approach that includes timestamping and tracking the effective periods of data objects. The system uses these timestamps to determine whether a particular piece of data is currently valid or not. In some implementations, to ascertain that the value associated with the data object is valid, the system relies on timestamps that denote the effective or valid period of the data. These timestamps reflect the time period when the data is created or modified, specifying the start and end dates during which the data is considered accurate and applicable. When the data object is queried, the processor evaluates the current date and time against these timestamps to determine validity. If the current date falls within the range specified by the effective period, the data object may be deemed valid and is presented as such to the end-users or users.

Conversely, the data object may be identified as no longer valid when its effective period has expired. This determination may be made based on the end date of the validity period, which is updated whenever modifications to the data object occur. If a newer version of the data object is introduced or the value associated with the data object is replaced, its effective period may be set to reflect its new validity range, while the prior version's end date is updated accordingly. The system will then exclude the expired data from active consideration.

Modifications to the data object or values associated with the data object may be used to make this determination. Each modification of the data object may be recorded with a timestamp. This timestamp may influence the validity periods of both the updated and preceding versions of the data. When a modification occurs, the system updates the timestamps to reflect the new effective period, thereby managing the transition between valid and invalid states.

In an additional embodiment, token data may include operational data. As used in the current disclosure, operational data refers to the historical record of changes made to the data object and values associated with the data object. Operational data documents the sequence of modifications, including who made the change, when it was made, and the nature of the modification. In a bitemporal system, operational data may be used to audit and trace the evolution of the data object over time. It captures the temporal aspects of transactions, such as the start and end dates of changes, providing a comprehensive historical account of the data's transformation.

The processor may identify the operational data by monitoring modifications to the values within the data objects, generating new operational data each time a change is detected. Operational data may include details such as the timestamp of the alteration, the identity of the user or system component responsible for the modification, and a description of the change. The system may employ change detection techniques to trigger the creation of the operational data, as well as versioning to differentiate between successive iterations of the data object.

The generation of operational data may be triggered by various events, including when new records are created, or when existing records are updated. It is also produced in response to corrective actions taken to address errors or inaccuracies in the data.

Some example systems and methods disclosed herein include generating one or more digital tokens as a function of the token data. As used in the current disclosure, the digital token is a cryptographic representation used in data management systems to authenticate, validate, and track information within digital environments. Digital tokens may function as unique identifiers or credentials that ensure the accuracy and integrity of data. Digital tokens can be employed to represent various temporal aspects of data, including periods during which data remains accurate and the times when data is stored or modified within the system.

The digital tokens may be a specific type of cryptographic construct utilized to manage and secure data within digital systems. Cryptographic constructs may be employed to secure and manage digital information. These constructs include various mechanisms and technologies used to protect data from unauthorized access, ensure its integrity, and validate its authenticity. The digital tokens may function as unique identifiers or credentials, each associated with a particular piece of data or transaction. By employing cryptographic techniques, these digital tokens ensure that data can only be accessed or modified by authorized entities, thereby protecting against unauthorized alterations and breaches. For instance, the digital token may serve as a cryptographic seal that ensures the integrity of data by confirming that it has not been tampered with.

In some implementations, each digital token can log the exact timestamp when a data transaction occurs, whether it is an access, modification, or deletion. This timestamp may be used to establish a chronological sequence of events, enabling the system to track when data was accessed or altered. For instance, if an employee's record is updated, the associated token will capture the precise time of the update, providing a clear timeline of changes. Additionally, digital tokens may also record the identity of the person or system responsible for the data transaction.

In an embodiment, digital tokens encompass one or more valid tokens. As utilized in the current disclosure, a valid token is a specific type of digital token that signifies the period during which data accurately reflects real-world facts.

Valid tokens act as markers to confirm the factual correctness of data within its relevant context. The assignment of a valid token to a particular data value is determined based on the alignment of the data with actual, verifiable real-world conditions during a specific timeframe. The determination process can include evaluating the data against established criteria or reference points that substantiate its accuracy and relevance to the real-world facts it represents. Valid tokens may be generated as a function of the valid data, as discussed in greater detail elsewhere herein.

Valid tokens may be used to ensure that users access information that reflects the true state of affairs as intended or recorded at a particular time, thereby upholding historical accuracy. This is particularly important for maintaining reliable records over time and ensuring that data is not misrepresented or misinterpreted. For instance, valid tokens enable the system to preserve and retrieve historical data accurately, supporting comprehensive reporting and analysis based on the data's factual history. Token data associated with the valid token may include dates and/or time stamps that are used to denote the validity of the data object.

Additionally, digital tokens include one or more operational tokens. As used in the current disclosure, operational tokens represent the period during which data is stored, updated, or otherwise managed within the digital system. These tokens track the lifecycle of data entries from their inception through various modifications and updates. By associating data values with operational tokens, the system provides a record of when changes were made, who made them, and the sequence of these changes. This facilitates comprehensive auditing, ensures accountability, and allows for the retrieval of historical data states based on system transactions. Operational tokens may be generated as a function of the operational data, as discussed in greater detail herein above.

Operational tokens are designed to represent and document the periods during which data is actively stored, updated, or otherwise managed within the system. Unlike valid tokens, which denote the periods during which data accurately reflects real-world facts, operational tokens focus on the internal management and modification history of the data. Each operational token is associated with specific events such as data creation, updates, deletions, alterations, modifications, or any other changes. By assigning these operational tokens with each modification of the data, the system records not only the timing of these changes but also information about who performed the changes and the sequence of such modifications. For instance, if an employee's salary record is updated from "$170,000" to "$175,000," the operational token would capture the exact date and time of the update, the user who made the change, and any relevant transaction metadata.

In some cases, operational tokens support the retrieval of historical data states based on system transactions. In scenarios where data needs to be restored to a previous state or reviewed for historical accuracy, these tokens make it possible to reconstruct the data's state at any given point in time.

Cryptographic methods such as hashing, encryption, and digital signing may be used to transform the token data into the digital token. Hashing can include applying a cryptographic hash function to the token data, producing a fixed-size hash value that uniquely represents the token data. This ensures that each digital token is distinctive and resistant to tampering. Encryption adds an extra layer of security by converting the token data into an unreadable format, which can only be decrypted with the appropriate key. Additionally, digital signing can include using a private key to create a signature that verifies the token's origin and integrity, allowing its authenticity to be confirmed with the corresponding public key. Hashing, encryption, and digital signing will be discussed in greater detail below. After the cryptographic processes are complete, the final digital token is issued. This token, typically in the form of a digital string or code, encapsulates the secured data and is either stored in a database, digital ledger, attached to a data object, or distributed to relevant parties, depending on its purpose.

The digital token may also include or take the form of metadata associated with the digital object. For example, the digital token may include information about the validity period of the data, transactional history, or the identities of users who have interacted with the data. By incorporating these digital tokens as metadata, the system enhances its ability to track and verify data integrity, manage data lifecycle, and ensure compliance with regulatory requirements. This meta-information, embedded in the form of tokens, acts as a digital record that can be queried and analyzed to gain insights into data usage, alterations, and historical states.

Systems and methods disclosed herein can include modifying the one or more values as a function of the one or more modifications. Modifying the one or more values can include updating specific fields to reflect the new information provided. For instance, consider a user interacting with the data object where they wish to update the field containing values associated with contact information. After the system receives the desired modification from the user, the system then updates the relevant attributes by replacing the old values with the new ones provided. This can include parsing the user input to ensure it adheres to the expected format and then applying the changes to the data object. After the update, the system might also validate the new values to ensure data integrity before saving the modified object.

Systems and methods disclosed herein can include constructing a second set of data objects as a function of the modified one or more values. Initially, the first set of data objects contains the original values. These original values are subjected to changes or updates based on the one or more modifications as discussed herein above. After identifying the necessary modifications, a new set of data objects is created to reflect these changes. This process may include iterating through the first set of objects, applying the specified modifications to each relevant field. For each data object whose values are modified, a corresponding new data object is instantiated, incorporating the updated values while preserving the integrity of the original structure. This second set of data objects can in some cases represent a snapshot of the data after the modifications, allowing for a clear distinction between the pre-update and post-update states. By maintaining this separate set, the system facilitates comparison, version control, and validation, ensuring that changes are accurately reflected and managed in the system. In an embodiment, the first data object and the second data object may be the same or substantially similar with the exception of the modified values or fields.

In an embodiment, constructing the second set of data objects comprises mapping the one or more digital tokens to the modified one or more values. The process of mapping the digital tokens to the modified values of the second data object may include assigning the digital token, including the valid data and the operational data, to specific modifications within the data object. This connection between the one or more digital tokens and the modified one or more values represents a bitemporal snapshot that captures both the effective and operational times of the changes made.

In an embodiment, each data object within the system may include a predefined schema that includes fields specifically designated for storing token information. When a modification occurs, the system updates the relevant field of the data object with the newly generated token. This mapping process may ensure that each modification is accurately reflected and traceable, aligning with both the temporal aspects of the change and the data object's version history. In some embodiments, the digital token may be stored as metadata within the digital object.

In an embodiment, the schema of the second data object may be designed to integrate this digital token. Specifically, the schema may incorporate fields such as 'modified ValueToken', 'validTime', and 'operationalTime'. The 'modifiedValueToken' field is designated for storing the unique token, while the 'validTime' and 'operationalTime' fields capture the relevant temporal details associated with the valid data and operational data, respectively.

In an embodiment, the process of mapping the digital token to the second data object may include attaching the digital token to the second data object as metadata. Upon the occurrence of a change in the original data object, a unique digital token is generated. The digital token, which includes beneficial details such as the effective time of the change and the transaction time of its recording, is then stored as metadata within this second data object. This metadata may be embedded in fields specifically designed for this purpose.

The system can determine whether the digital token is correctly attached to the second data object by updating the metadata fields accordingly. Validation checks are performed to verify that the token is properly formatted and that the metadata fields are accurately populated.

In an alternative embodiment, the digital tokens may be systematically stored in a dedicated token database. During the mapping process, the system assigns the digital token from the token database to this new data object (i.e. the second data object) based on the modification it represents. Subsequently, the token database is updated to reflect this assignment to link the token to the new data object. This mapping establishes a clear and verifiable connection between the digital token and the data object it represents.

Another aspect of the present disclosure is directed to solutions for avoiding concurrent modifications of data objects. Concurrent modifications can occur when multiple operations attempt to update the same piece of data at the same time. This can lead to inconsistencies, data corruption, and other unintended effects that can compromise the integrity of the database.

One proposed approach to handling concurrent modifications is a locking mechanism. This approach can include placing a lock on a document when an update is initiated, preventing other operations from modifying the document until the initial update is completed. This serialization of updates ensures that they are processed in a first-in-first-out (FIFO) manner, maintaining the order of transactions.

Another proposed solution is to detect concurrent modification and rollback. This technique can leverage a key constraint to monitor for concurrent modifications. When an update is made, the system checks for any other modifications occurring at the same time. If a concurrent modification is detected, the system automatically rolls back the initial update and retries it. This method is generally more lightweight and scalable than locking, as it does not require holding locks for extended periods.

Another example approach is to serialize writes to key constraint. This approach can include creating a hash of key constraints for each document and assigning a specific worker or process to handle updates for each unique hash value. By ensuring that only one worker can process updates for a given set of key constraints at any time, this approach serializes the updates, reducing the likelihood of concurrent modifications. This can enhance performance by distributing the load evenly across multiple workers and avoiding the overhead associated with locks.

With reference now to the Figures, example embodiments of the present disclosure will be discussed in further detail.

FIG. 1 depicts a block diagram of an exemplary system 100 for managing a plurality of data objects in a bitemporal manner. System 100 includes one or more processors 102 that can be utilized to perform one or more operations. The one or more processors 102 can include any suitable processing device (e.g., a processor core, a microprocessor, an ASIC, a FPGA, a controller, a microcontroller, etc.) and can be one processor or a plurality of processors that are operatively connected. The one or more processors 102 can perform operations in series and/or in parallel. The one or more processors 102 may be dedicated to a particular computing device and/or may be utilized by a plurality of devices to perform processing tasks.

Processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. This may be used to train, refine, or otherwise improve any algorithm or machine learning model, neural network, and the like mentioned herein.

Processor 102 may include a single computing device operating independently, or may include two or more computing devices operating in concert, in parallel, sequentially or the like; two or more computing devices may be included together in a single computing device or in two or more computing devices. Processor 102 may include but is not limited to, for example, a computing device or cluster of computing devices in a first location and a second computing device or cluster of computing devices in a second location. Processor 102 may include one or more computing devices dedicated to data storage, security, distribution of traffic for load balancing, and the like. Processor 102 may distribute one or more operations as described below across a plurality of computing devices, which may operate in parallel, in series, redundantly, or in any other manner used for distribution of tasks or memory between computing devices.

System 100 may include memory 104 which can store data and/or instructions. Memory 104 can include one or more non-transitory computer-readable storage mediums, such as RAM, ROM, EEPROM, EPROM, flash memory devices, magnetic disks, etc., and combinations thereof. The data can include user data, application data, operating system data, etc. The data can include text data, image data, audio data, statistical data, latent encoding data, etc. The instructions can include instructions that when executed by one or more of the processors 102 may cause system 100 to perform operations as described herein.

Memory 104 may store data and/or instructions associated with one or more applications. The one or more applications can include native, factory-set applications and/or downloaded applications. The applications may include one or more messaging applications, one or more image capture applications, one or more social media applications, one or more productivity applications, one or more map applications, one or more device management applications, one or more browser applications, and the like. In some implementations, the applications can include one or more applications communicatively connected to one or more server computing systems for providing access to a platform. For example, the applications can include an application for managing a plurality of data objects in a bitemporal manner.

With continued reference to FIG. 1, the operations include maintaining a first set of data objects 106 comprising one or more values 108 corresponding to one or more data fields 110. In an embodiment, the first set of data objects 106 may be defined according to its associated schema, which delineates the data fields 110 and the permissible values 108 for each field. This schema may be applied across each data object that is discussed herein, including but not limited to the first data object 106, the second data object, the third data object, up to the nth data object.

The first set of data objects 106 may encompass a variety of information. These data fields 110 represent distinct categories or attributes pertinent to the data object 106, and the values 180 assigned thereto can encompass a broad spectrum of information types. Such information may include but is not limited to numerical data, textual content, dates, or other relevant data types that the data fields are structured to accommodate. The values 108 contained within each data object 106 may be recorded and stored in accordance with the defined data fields 110.

In an embodiment, the first set of data objects 106 may encompass a wide variety of human resource information. The first set of data objects 106 may be used to capture and manage details related to an individual employee within an organization. In a non-limiting example, the first set of data objects 106 may include fields 110 for an employee ID, the employee's full name, date of birth, gender, phone number, email address, and contact details including address fields for the employee's current residential location.

Additionally, the first set of data objects 106 may include employment-related details, including the employee's job title, department, employment status, supervisor, and key dates such as the start and, if applicable, end date of employment. Fields 110 within the first set of data objects 106 may be digested for compensation and benefits information for the employee. This may include information related to the employee's salary, payment frequency, and benefits such as health insurance and retirement plans. The first set of data objects 106 may include educational qualifications, certifications, and credentials relevant to the employee's role. Performance records may be included within the first set of data objects 106, this may include fields 110 documenting evaluations, feedback, and any disciplinary actions, as well as employment history detailing prior roles and responsibilities.

In an embodiment, the first set of data objects 106 may include a first plurality of key value pairs, each key value pair comprising a value for a key. As used in the current disclosure, a key-value pair refers to a data structure consisting of two interrelated components: a key and the value 108. Each key is designed to be unique within its specific context or data structure, ensuring that no two keys can be identical within the same scope. This uniqueness may be used to maintain integrity and ensure accurate access. In some embodiments, the key acts as an index or lookup identifier that directs the system to the correct value, thereby streamlining data operations and minimizing the risk of errors.

Together, the key and value form a pair that allows for efficient data management and retrieval. For instance, in a database, a key-value pair might be used to store user information, where the key could be a unique user ID and the value could be a set of details such as name, email address, and phone number. When a query is made using a user ID (the key), the system quickly retrieves the associated user details (the value).

With continued reference to FIG. 1, the first set of data objects 106 may be represented within an object graph. As used in the current disclosure, an object graph is a data structure used to represent and visualize the relationships and interactions between various data objects within a system. The object graph may be used to illustrate how these objects are interconnected, depicting data objects and their relationships or associations as edges or links between these data objects.

The object graph may serve to illustrate or otherwise encode or represent the interrelationships between various data objects. This object graph comprises a plurality of data objects representing various entities such as documents, users, and folders. In an embodiment, data objects representing a document may encapsulate attributes including title, content, author, and creation date. Similarly, data objects representing a user may contain attributes like username, email, and access permissions.

In an embodiment, the object graph can effectively represent alternate versions of the first set of data objects 106 by incorporating both the valid-time and operational-time dimensions of each relationship and attribute. The object graph's nodes can be enhanced to reflect these temporal aspects.

For example, edges between a document data object and a folder data object can be annotated with attributes that capture not only the date of inclusion but also the time period during which this relationship was valid (valid-time) and the period during which this relationship was recorded or updated in the system (operational-time). This dual temporal tracking allows the object graph to capture and reflect changes in document placement within folders over time.

Similarly, edges connecting folder data objects can illustrate hierarchical relationships with temporal dimensions, showing how folder nesting has evolved. These edges can record changes in the hierarchical structure, reflecting both the time periods when such organizational changes were effective and when they were documented in the system.

With continued reference to FIG. 1, the operations include receiving one or more modifications 112 associated with the one or more values 108. The one or more modifications 112 refer to any alterations or updates made to existing data values. These modifications 112 may be used to ensure that the data remains current, accurate, and reflective of the real-world context or evolving requirements. Modifications 112 can encompass a range of operations, including updates, deletions, or additions.

The process of receiving and processing these modifications 112 can include validating the modifications to ensure they meet predefined criteria and do not introduce inconsistencies. For instance, an update to a value 108 might be subject to validation rules to ensure that the new data adheres to format specifications or business rules. Once validated, the system applies the modifications 112, updating the data store accordingly. This can include overwriting existing values, adding new records, or removing obsolete entries.

In an embodiment, modifications 112 may include modifications that are incapable of being performed with an append-only operation. These modifications 112 can include changes to data that cannot be achieved merely by adding new entries to the end of a dataset. When applying the append-only operation, the only allowed operation is to add new records or values, with no provisions for altering or removing existing data. This constraint inherently limits the types of modifications that can be performed.

Modifications 112 that cannot be performed in an append-only system may include updating existing data. Updating can include changing the value 108 associated with an existing key. For example, if a field 110 associated with a user's email address needs to be updated from "user@example.com" to "newuser@example.com," this change may not be able to be achieved through appending. Instead, it requires modifying the existing record to reflect the new value 108. An append-only system would lack the capability to overwrite or alter existing entries, thus necessitating a different approach, such as a full overwrite or a separate update mechanism.

In an embodiment, modifications 112 may include modifications comprising retroactively dated changes. As used in the current disclosure retroactive modifications, represent a class of data alterations that include adjusting the historical record to reflect updates or corrections applied to past data. These modifications may be characterized by their ability to amend data that is associated with a date prior to the modification's actual occurrence.

Retroactive modifications may be implemented when there is a need to correct, update, or enhance historical data that has already been recorded. For example, if a database entry needs to reflect a change in an employee's job title that was effective six months ago, a retroactive modification would adjust the historical record to show the correct title as of the specified past date.

In an embodiment, modifications 112 may include modifications comprising future-dated changes, particularly those that occur prior to an existing future-dated modification. Future-dated modifications that occur prior to an existing future-dated modification can include updates or alterations to data that are set to take effect at a future date. These modifications 112 are characterized by their intended application at a date later than the current system date, and they are executed in advance of another scheduled future modification.

Future-dated modifications refer to alterations or updates that are scheduled to become effective at a specified date in the future. For instance, if system 100 is configured to update an employee's salary on Jan. 1, 2025, this represents a future-dated modification. When additional modifications are introduced to occur before this existing future-dated change, they can be recorded and managed with precision to ensure that the sequence of changes aligns with the intended schedule. This necessitates that the system accurately incorporates and prioritizes these modifications according to their designated effective dates, ensuring that no conflicts or inconsistencies arise between overlapping future-dated changes.

With continued reference to FIG. 1, the operations further comprise generating token data 114 as a function of each modification 112 of the one or more modifications 112. Generating token data 114 as a function of each modification 112 can include creating a unique representation or record that encapsulates the details of each change made within system 100. This token data 114 may be used to maintain a comprehensive and traceable history of modification 112. In the context of bitemporal data management, the token data 114 may comprise bitemporal values, including valid data 116 and operational data 118.

The process of generating token data 114 as a function of each modification 112 can include recording and tracking each change to the data object. Tracking the changes to the data object may include generating timestamps that identify the temporal data associated with each modification. This temporal data may include valid data 116 and operational data 118.

As used in the current disclosure, valid data 116 refers to the temporal dimension that captures the period during which the modification is considered accurate or applicable in the real world. For instance, if a modification 112 is applied to a customer's address effective from a specific future date, the valid data 116 would record the start and end dates during which this address is deemed valid. This ensures that the data accurately reflects its relevance over time, providing clarity on when the changes are applicable.

As used in the current disclosure, operational data 118 pertains to tracking the period during which the modification is recorded and managed within the system. This includes the timestamps of when the modification was logged, processed, and potentially overwritten or deleted. Operational data may additionally include information regarding who the author of the changes is.

With continued reference to FIG. 1, the operations include generating one or more digital tokens 120 as a function of the token data 114. Digital tokens 120 are digital representations that encapsulate specific details of modifications made to data objects. Each digital token 120 is derived from the token data 114 and includes information that supports both the recording and retrieval of modifications 112.

The creation of digital tokens 120 begins with the tokenization of the token data 114, wherein the raw token data is transformed into a secure digital format. This transformation may employ advanced cryptographic algorithms to create a unique digital representation of the modification 112. After the token data 114 has been tokenized, the digital token 120 will accurately reflect the modification while taking on immutable traits. The result is a digital token that is securely associated with the specific change recorded in the system.

During tokenization, the raw data undergoes a series of transformations using cryptographic algorithms, as discussed herein above. Initially, the data is converted into a standardized format suitable for further processing. This conversion transforms the data structures into a format compatible with cryptographic methods. Subsequently, digital tokens 120 are generated through these cryptographic algorithms. Each digital token 120 is designed to be distinct, ensuring that it uniquely represents the specific modification within the data management system, which is beneficial for accurate tracking and referencing.

Encryption may be applied to secure the digital tokens 120. This can include encoding the token with a cryptographic key, rendering it into a format that is not readily accessible or alterable by unauthorized parties.

Additionally, the digital tokens 120 may be embedded with metadata, including attributes such as effective dates, operational timestamps, and modification identifiers. This metadata can be used to determine whether the token accurately reflects the temporal and contextual aspects of the modification.

In an embodiment, system 100 may create the one or more digital tokens 120 using a machine learning model. The process begins with the machine learning model receiving and analyzing the raw token data 114. This token data 114 may be used to train the machine learning model. Through supervised learning techniques, the machine learning model learns to identify patterns and relationships within the token data 114, allowing it to predict and generate appropriate digital tokens 120. The training phase can include feeding the model historical data that includes previous modifications and their associated tokens. By learning from this data, the model acquires the capability to generalize and apply its knowledge to new modifications.

Once trained, the machine learning model can then be employed to generate digital tokens 120 from new token data 114. The machine learning model processes the incoming token data 114, applying the patterns and relationships it has learned to create digital tokens 120 that accurately represent each modification 112.

Furthermore, the machine learning model can enhance the process of token generation through continuous learning and adaptation. As new modifications 112 are introduced and additional token data 114 becomes available, the machine learning model can be retrained to refine its predictions and improve its accuracy. This iterative process ensures that the model remains up to date with the latest data patterns and continues to generate digital tokens that reflect current data management practices.

In an embodiment, generating a digital token 120 from token data 114 can include leveraging machine learning models trained on extensive historical modification data. By analyzing past token data 114, including previously recorded modifications and their attributes, the machine learning model can discern patterns and trends relevant to the generation of digital tokens 120. This training enables the model to enhance its accuracy and efficacy in producing digital tokens 120 that accurately reflect the underlying modifications. The machine learning model iteratively refines its algorithms by processing this historical data, thereby continuously improving the precision of the generated tokens.

The training of the machine learning model to generate digital tokens 120 can include fine-tuning its parameters, such as weights and biases, based on previous token data 114 and modification attributes. During the training phase, an error function is utilized to assess the discrepancy between the model's generated digital tokens 120 and the actual modification data from historical records. This discrepancy is used to guide the iterative refinement of the model's parameters. Techniques such as gradient descent or backpropagation may be employed to minimize this error, thereby enhancing the model's capability to generate accurate digital tokens 120. As the training progresses, the model becomes increasingly adept at producing tokens that precisely represent modifications, with adjustments continuing until the model's performance stabilizes at a satisfactory level of accuracy.

The machine learning model's ability to generate digital tokens 120 improves as it learns from the patterns and relationships within the token data 114. By continually refining its predictions based on historical data and minimizing discrepancies through iterative adjustments, the model ensures that the digital tokens 120 accurately capture the details of each modification. This process of training and refinement may apply to any machine learning algorithms, model, or algorithm discussed herein.

In an embodiment, the digital token 120 is stored in a secure token database 122 or distributed ledger. Within the token database 112 each digital token 120 is linked to its corresponding modification 112, providing a clear and precise record of the change. This linkage allows for effective tracking and retrieval of modification details, ensuring that the system maintains an accurate and reliable historical record of all data changes.

In an embodiment, The token database may be structured with a schema that includes fields such as 'tokenID', 'dataObjectID', 'modificationDetails', 'validTime', and 'operationalTime'. The 'tokenID' serves as a unique identifier for each token, while the 'dataObjectID' field may reference the specific data object associated with the token. Additionally, 'modificationDetails' describe the nature of the change, and 'validTime' and 'operationalTime' record the respective temporal details.

In an embodiment, the token database may be situated remotely from the processor, connecting via one or more networks. These networks may include, but are not limited to, cloud networks, mesh networks, or other similar network configurations. For instance, a cloud-based system, as used in this context, refers to a setup where software and/or data are stored, managed, and processed on a network of remote servers hosted on the Internet, rather than being maintained on local servers or personal computers. This arrangement facilitates remote access and scalability.

Alternatively, a mesh network, as described herein, denotes a local network topology where infrastructure processor establishes direct, dynamic, and non-hierarchical connections with multiple other computing devices. This network structure enhances communication efficiency by allowing each node to relay data to and from neighboring nodes, creating a resilient and adaptable network environment.

The token database 112 can be implemented in various formats suitable for its intended functions. It may be a relational database, a key-value retrieval database such as a NoSQL database, or any other database structure that a skilled practitioner would recognize as appropriate given the full context of this disclosure. Additionally, the token database 112 may utilize distributed data storage protocols or structures, such as a distributed hash table, to manage and organize data efficiently across multiple nodes.

With continued reference to FIG. 1, the operations include constructing a second set of data objects 126 as a function of the modified one or more values 128. Constructing a second set of data objects 126 as a function of modified values 128 can include creating a new data object that reflects and incorporates changes made to the original values 108 based on the modification 112. The creation of the second set of data objects 126 can include modifying the original values 108 based on the modification 112 to create the modified values 128. These changes can be accurately represented in the second set of data objects 126. To achieve this, the system identifies the specific values 108 that have been altered by the modification 112. These modified values 128 are then used as the basis for constructing the second set of data objects 126.

In constructing the second set of data objects 126, the modified values 128 are systematically integrated into a new data object that reflects the updated information. This process can include creating new data structures that incorporate the modified values 128 while preserving the integrity of the overall data schema. The second set of data objects 126 are designed to represent the state of the data after the modification has been applied, ensuring that all updates are accurately captured and recorded.

The construction process also includes the careful alignment of the second set of data objects 126 with the existing data architecture. This alignment ensures that the second set of data objects 126 are consistent with the overall data model and that they accurately represent the modifications within the context of the entire dataset. The system may perform validation checks to confirm that the new data objects correctly reflect the modified values and integrate seamlessly with the existing data structures.

Additionally, the creation of the second set of data objects 126 can include the maintenance of metadata and historical records associated with the modifications 112. Metadata such as timestamps, modification identifiers, and other relevant attributes may be incorporated into the second set of data objects 126 to provide a comprehensive record of the changes. This metadata is beneficial for ensuring that the new data objects can be accurately traced and audited in the future.

Figure 2:
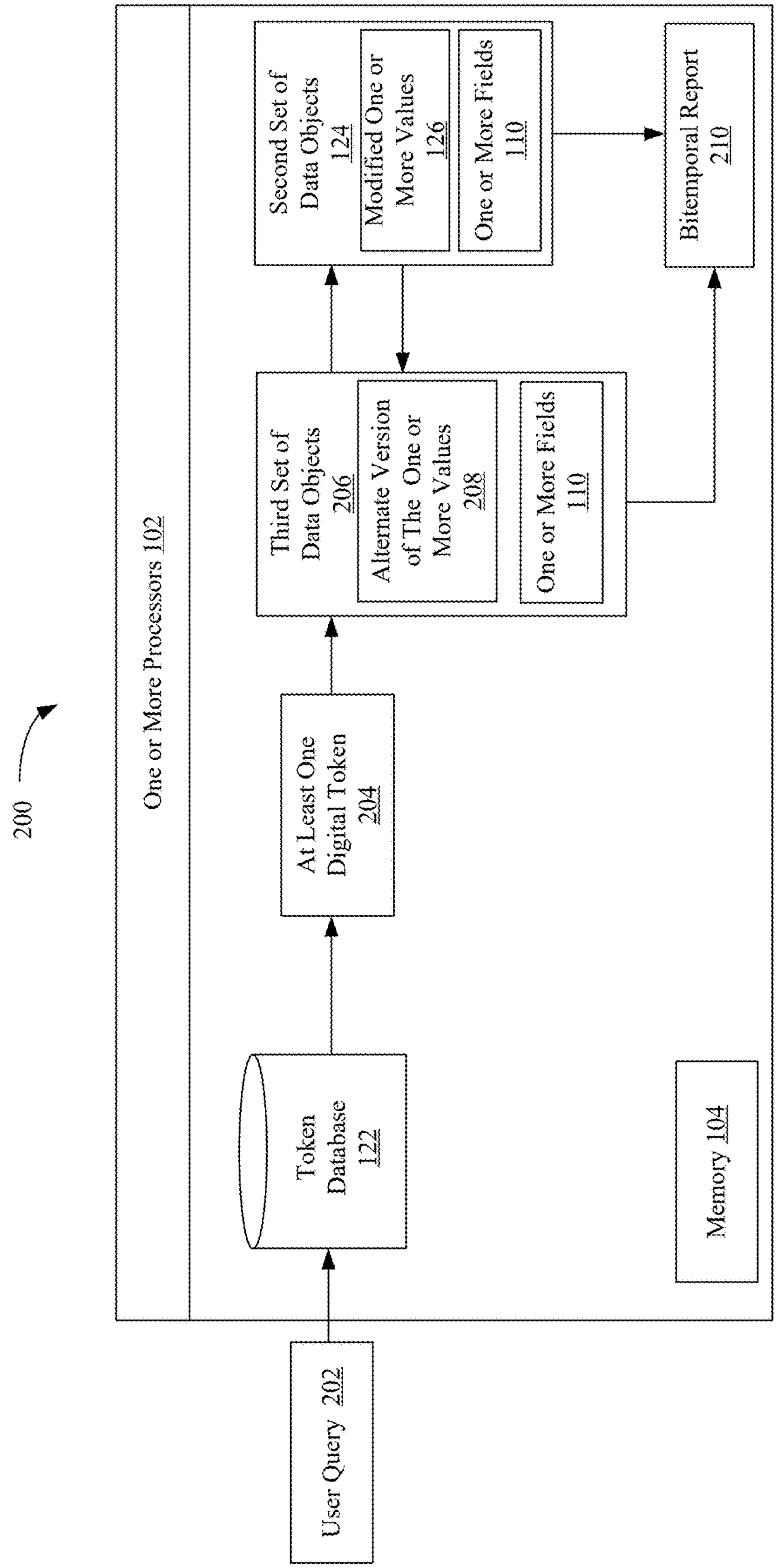
FIG. 2 is a block diagram of an exemplary system for generating a bitemporal report in accordance with embodiments of the present disclosure.

Referring now to FIG. 2, a block diagram of an exemplary system for generating a bitemporal report in accordance with embodiments of the present disclosure.

In an embodiment, the operations may further comprise receiving a user query 202. The user query 202 may be designed to query the token database 122, which houses detailed records of digital tokens 120 created from token data 114. The content of the user query 202 may include various parameters of the search that are used to identify the desired token data 114. These components may consist of specific identifiers, timestamps, metadata attributes, or other criteria relevant to the modifications 112 and token data 114. For instance, a user query may request data related to a particular modification 112, seek digital tokens 120 valid within a certain date range, or query tokens associated with specific operational data.

The user query 202 can be received through various interfaces or channels provided by system 200. These interfaces may include web-based forms, application programming interfaces (APIs), or other interactive tools that facilitate user input. The user query 202 is submitted via these interfaces and transmitted to the system for processing. Upon receipt, the system parses the query to extract the relevant search parameters and criteria.

Once the query is received and parsed, the system 200 performs a search within the token database 122 based on the defined parameters. This search can include filtering and retrieving records that match the criteria specified in the user query 202. The results of the query are then compiled and presented to the user, providing the requested information in a format that is accessible and understandable. This may include detailed records of digital tokens 120, metadata, and any associated historical data relevant to the modification in question.

In an embodiment, the operations may further comprise selecting at least one digital token 204 from the token database 122 as a function of the user query 202. The process of selecting the at least one digital token 204 can include a series of steps aimed at filtering and identifying the digital token 204 that corresponds to the criteria specified in the user query 202. The selection process may begin when system 200 receives the user query 202 and parses it to extract the search parameters and criteria. These parameters may include specific identifiers, date ranges, metadata attributes, or other relevant criteria related to the digital tokens stored in the token database 122. The parsed query is then used to guide the search and selection process.

To select the appropriate digital token 204, the system initiates a search within the token database 122 based on the criteria defined in the user query 202. This search can include filtering the database records to identify those digital tokens that match the specified parameters. The system applies logical operations and comparison algorithms to evaluate each digital token against the query criteria. For example, if the user query requests tokens associated with a particular modification identifier, the system will filter the database to find tokens that correspond to that identifier.

Once the filtering process is complete, the system may apply additional sorting or prioritization rules to refine the selection of digital tokens 204. Sorting may be based on factors such as relevance, recency, or any other criteria specified in the user query 202 or inherent to the token data. The refined set of tokens is then reviewed to ensure that it accurately reflects the user's request and that no relevant tokens are omitted.

In an embodiment, the operations further comprise constructing a third set of data objects 206 as a function of the selection, wherein the third set of data objects comprises an alternate version of the one or more values 208. Constructing the third set of data objects 206 as a function of the selection process can include creating new data representations that reflect alternate versions of the one or more values 208. These alternate versions of the one or more values 208 may be derived from an alternate bitemporal timeline.

As used in the current disclosure, the alternate bitemporal timeline refers to a secondary temporal dimension that tracks the changes to the data from a different perspective or timeframe than the valid timeline. The valid timeline represents the chronological order and validity of data as it applies to real-world events, while the alternate timeline may track historical data, hypothetical scenarios, or alternative records within the system. By creating a third set of data objects 206 based on this alternate timeline, the system enables users to view and analyze data from these different temporal contexts.

In a non-limiting example, consider a data management system used by a large organization to track employee information and historical records. The valid timeline represents the actual sequence of changes to an employee's records based on real-world events. For instance, if an employee, Jane Smith, was promoted from Junior Developer to Senior Developer on Jan. 1, 2023, this change is recorded on the valid timeline. The system reflects her role, salary adjustments, and other relevant data as of the promotion date, showing how her employment status evolved in real-time.

An alternate bitemporal timeline might be used to track hypothetical scenarios, such as what the employee's career progression might have looked like under different conditions. For instance, let's consider an alternate timeline where Jane Smith took a different position within the company, such as a Project Manager, starting on Jun. 1, 2022, instead of Jan. 1, 2023. This alternate timeline would include hypothetical changes to her role, responsibilities, and salary as if she had followed this different career path.

To accommodate this alternate bitemporal timeline, the system 200 may construct the third set of data objects 206 that reflect Jane Smith's data within this hypothetical scenario. The third set of data objects 206 captures the alternate versions of her job titles, salaries, and other attributes based on the alternate timeline starting from Jun. 1, 2022.

In an embodiment, constructing the third set of data objects 206 comprises forecasting the alternate version of the one or more values 208 to a target date. Forecasting the alternate version of one or more values to a target date can include projecting data into the future based on alternate bitemporal timelines to anticipate potential outcomes and scenarios.

The process may begin with defining the target date and the parameters of the alternate bitemporal timeline. The target date is the future point in time at which the forecasted values will be assessed. The target date may be received from the user or may be generated by system 200.

System 200 may utilize predictive analytics and forecasting models to estimate how the one or more values will change over time based on the alternate scenario. This can include applying statistical techniques and algorithms that consider historical data, trends, and the specific parameters of the alternate timeline. In an embodiment, a machine learning model or algorithm may be used to generate the forecasted values.

Once the forecasted values are generated, the third set of data objects may be created to represent the alternate version of the values projected to the target date. These data objects reflect the anticipated changes and are designed to provide a comprehensive view of the expected outcomes under the alternate scenario. The forecasted values are embedded with metadata and context to ensure clarity and accuracy in their representation.

The construction of the third set of data objects 206 begins with the selection of relevant digital tokens 204 from the token database 122. The selection of the digital tokens 204 may be used to identify the specific alternate versions of the one or more values 208 that correspond to the selected digital tokens 204. These alternate values 208 may reflect the data as it appears within the alternate bitemporal timeline, capturing how the data has evolved or been represented differently over time. The third set of data objects 206 may be constructed to incorporate these alternate values. The third set of data objects 206 is designed to reflect the alternate versions while maintaining consistency with the overall data schema. This can include integrating the alternate values into the data objects and ensuring that all related metadata and attributes are accurately represented.

The third set of data objects 206 may be aligned with the alternate bitemporal timeline to ensure that the data reflects the correct temporal context. This alignment can include embedding appropriate timestamps and historical context into the data objects, allowing users to understand how the data fits within the alternate timeline.

With continued reference to FIG. 2, the operations may further comprise generating a bitemporal report 210 as a function of a comparison between the second set of data objects 124 and the third set of data objects 206. Generating the bitemporal report 210 can include analyzing and documenting differences between alternate values 208 and valid values 128. This bitemporal report 210 serves as a tool for understanding the impact of hypothetical scenarios or alternate timelines on the actual data. The bitemporal report may provide a detailed account of how the alternate values 208 compared to the valid values within system 200. It offers a comprehensive view of the potential impacts and deviations resulting from hypothetical or alternate scenarios, enabling users to assess the validity of forecasts, understand their implications, and make informed decisions based on this comparative analysis.

The bitemporal report 210 may be generated based on a comparison between the second set of data objects 124 and the third set of data objects 206. In an embodiment, the second set of data objects 124 represents revised or updated values based on modifications recorded in a valid bitemporal timeline, while the third set of data objects 206 contains the alternate version of the values 208 projected to a target date. To create a comprehensive bitemporal report 210, the system performs a comparison between these two sets of data objects. This comparison can include analyzing discrepancies, trends, and variances between the updated values and the forecasted projections, identifying how the forecasted values diverge from the valid values recorded in the original timeline.

To generate the bitemporal report 210, the system 200 identifies the specific attributes and metrics to be compared across both sets of data objects. This may include any values or points that have been changed based on the alterations or forecasting. The bitemporal report 210 is then generated by documenting these comparisons, highlighting significant differences, and providing context for the observed variances. The bitemporal report 210 may include visual representations, such as graphs or charts, to clearly illustrate the differences between the valid values and forecasted values.

In an embodiment, the bitemporal report 210 may be generated using a machine learning model or large language model. The machine learning model can be used to analyze patterns and trends within the data, identify significant deviations, and predict potential future impacts based on the comparison of the two sets of data objects. For instance, the machine learning model might employ algorithms to assess the statistical significance of differences, detect anomalies, or generate predictive insights based on historical data and forecasted scenarios.

Figure 3:
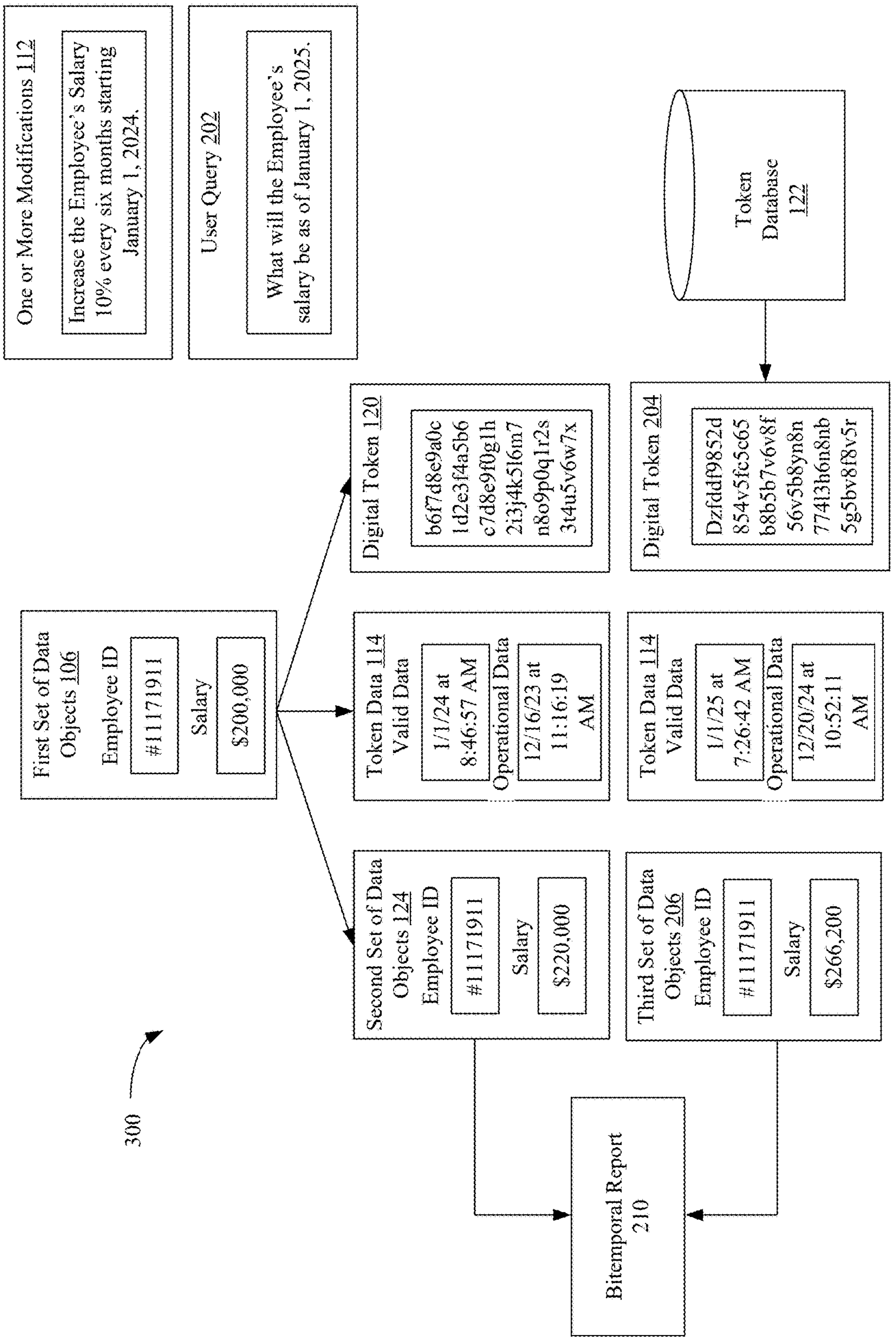
FIG. 3 is a block diagram of an exemplary system for generating a bitemporal report in accordance with embodiments of the present disclosure.

Referring now to FIG. 3, a diagram of an exemplary system for generating a bitemporal report in accordance with embodiments of the present disclosure. FIG. 3 depicts a non-limiting example wherein a bitemporal report 210 is generated based on the comparison between two data objects.

FIG. 3 depicts the process of querying the token database 122 to retrieve specific data, such as employee salary information. This data is reflected in the second set of data objects 124, which includes values associated with current salary figures, such as $220,000 for a given employee.

In this example, these values 128 are forecasted to a future target date, such as Jan. 1, 2025, by creating a third set of data objects 206. This forecasting process uses predictive algorithms to estimate future values based on the current data and anticipated changes, such as salary increases.

To create the third set of data objects 206, the digital tokens 204 containing the current salary information are first decrypted to access the relevant data. Once decrypted, the token data 114 is used to generate the forecasted figures for the target date. The bitemporal report 210 is then generated to compare the current salary data with the forecasted salary data. This report highlights the differences between the valid values and the projected values, potentially using visual aids such as charts and graphs to illustrate the anticipated changes.

Figure 4:
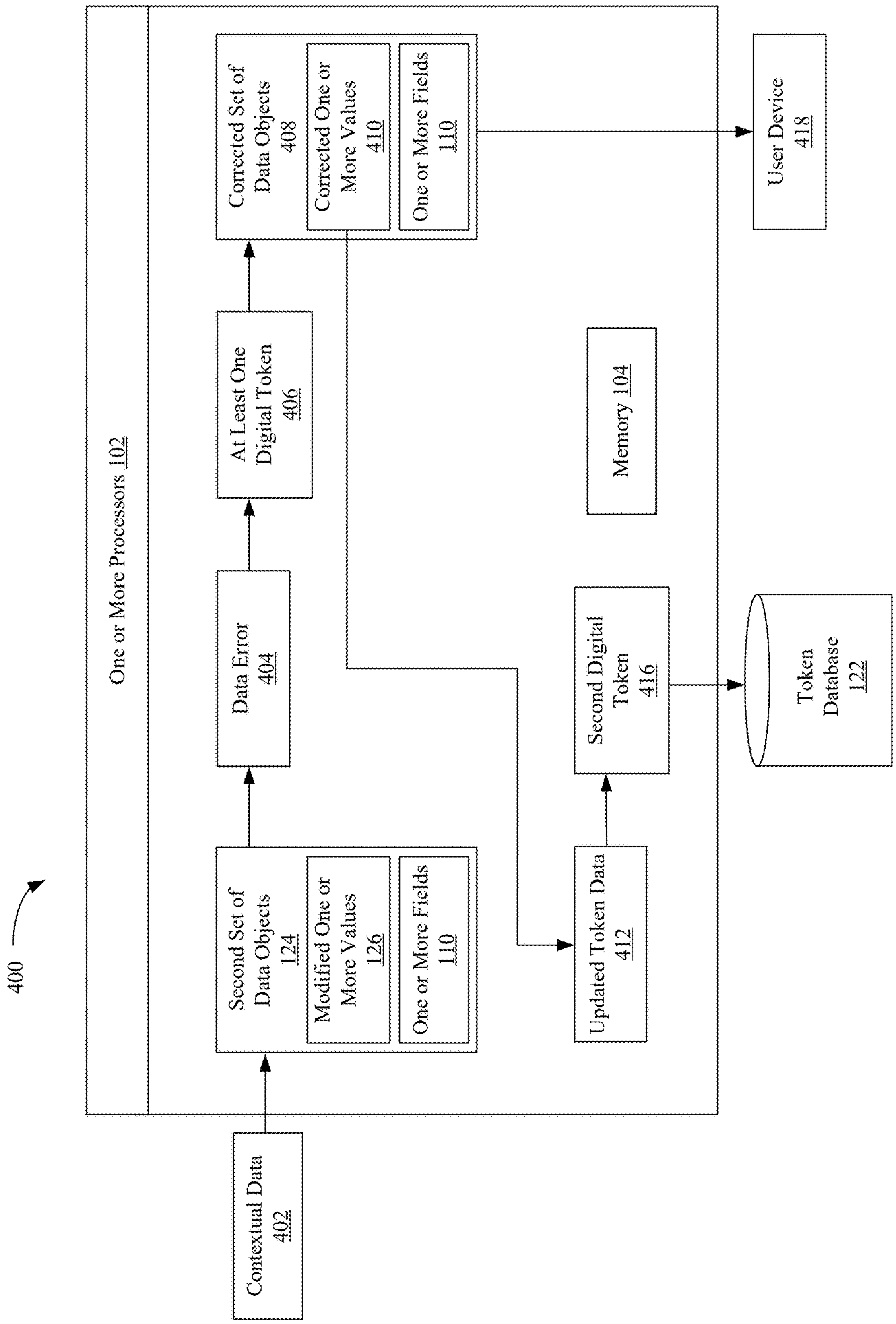
FIG. 4 is a block diagram of an exemplary system for identifying a data error within a data object in accordance with embodiments of the present disclosure.

Referring now to FIG. 4, an exemplary system for identifying a data error within a data object in accordance with embodiments of the present disclosure.

With continued reference to FIG. 4, the operations further include receiving a plurality of contextual data associated with the second set of data objects. As used in the current disclosure, contextual data 402 refers to the ancillary information that provides background, situational relevance, and interpretative value to the core data contained within the second set of data objects 124. Contextual data 402 may encompass various types of information such as historical trends, environmental conditions, operational metrics, and other pertinent factors that influence or inform the primary data. For example, in the context of employee salary data, contextual data might include departmental budgets, employee performance metrics, or economic indicators that impact salary adjustments.

In the context of identifying data errors 404, contextual data 402 may be used to provide background information that helps clarify and validate the core data.

In an embodiment, the system 400 may gather the relevant contextual data 402 from various sources, which may include internal databases, external data providers, or integrated applications. This contextual data 402 may be collected through automated data feeds, API integrations, or manual data entry, depending on the data sources and the system's capabilities.

With continued reference to FIG. 4, the operations may further include identifying a data error 404 within the second set of data objects 124 as a function of the plurality of contextual data 402. As used in the current disclosure, a data error 404 is characterized as any discrepancy or anomaly within the data objects that deviates from expected norms or patterns. Such errors may manifest as inaccuracies, inconsistencies, or misrepresentations in the data entries. For example, if the second set of data objects 124 contains values that significantly diverge from historical trends or expected seasonal variations, these deviations could indicate potential data entry errors, misreporting issues, or inaccuracies in the underlying data processing mechanisms. Identifying these errors is beneficial for ensuring the integrity and reliability of the data used in decision-making processes.

To effectively identify data errors 404 within the second set of data objects 124), the system 400 may perform a comparative analysis where the second set of data objects 124 are assessed in conjunction with the contextual data 402. This comparative process can include scrutinizing the data entries for any significant deviations from established norms or expected values. The contextual data 402 thus serves as a benchmark to detect and substantiate these discrepancies.

In an embodiment, the analysis may incorporate various techniques and algorithms to quantify the deviations and assess their statistical significance. This can include using statistical models, trend analysis, and anomaly detection algorithms to systematically identify and validate the nature of the errors. By contextualizing the data with historical and operational metrics, the system enhances its ability to accurately pinpoint errors and ensure that any identified discrepancies are both relevant and actionable.

With continued reference to FIG. 4, the operations may further include constructing a corrected set of data 408 objects as a function of the selection of a digital token 406 from the token database 122. As used in the current disclosure, the corrected set of data objects 408 refers to the revised data entries that reflect the necessary corrections to address the identified data errors 404. The corrected set of data objects 408 may be constructed by integrating the corrected values 410 into new data structures that replace or amend the erroneous entries. The process can include a thorough review of the digital tokens 406 associated with the data error 404 to ascertain the precise nature of the correction required. Once the corrections are identified, the corrected data objects 408 are created to embody the revised information, ensuring that they adhere to the integrity and consistency of the data schema.

The selection process for digital tokens 406 associated with the data error 404 can include several systematic steps to ensure accuracy and relevance. Initially, the system identifies the specific digital tokens 406 linked to the erroneous data entries. This is achieved by querying the token database 122 with parameters derived from the identified data error 404. The digital tokens 406 are filtered based on their association with the erroneous data, and relevant tokens are selected for further analysis.

Subsequently, the system evaluates each selected digital token 406 to determine its specific data entry and the nature of the data error 404 it represents. This evaluation process includes reviewing the metadata and historical context associated with each token to understand the scope of the error and the necessary corrections. Once the erroneous tokens are identified and verified, the system uses this information to construct the corrected set of data objects 408.

The corrected data objects 408 are then created by applying the necessary modifications to the data entries linked to the selected digital tokens 406. This process can include updating the data values to reflect the accurate information and ensuring that these updates are consistent with the overall data architecture. The corrected set of data objects 408 is subsequently validated to confirm that it effectively addresses the identified errors and integrates seamlessly with the existing data structures.

With continued reference to FIG. 4, the operations may further encompass updating the token data 412 based on the corrected set of data objects 408. This process can include revising the existing token data 114 to reflect any corrections made to address identified errors in the data. This may include generating and integrating new timestamps that correspond to the updated values. The corrected set of data objects 408 represents the revised information following the resolution of any discrepancies, and the updated token data 412 incorporates these revisions to ensure that the token database 122 accurately reflects the corrected data. Upon creation of the corrected set of data objects 408, the system will update the token data 412 by incorporating timestamps and other relevant modifications that align with the corrected information. The updated token data 412 ensures that all records accurately reflect the changes and corrections made.

Following the update of the token data 412, the system generates a second digital token 416 based on the revised information. The second digital token 416 is defined as a new or updated identifier that encapsulates the corrected token data 412. This token acts as a unique reference for the updated data entries and provides a mechanism for tracking and managing the revised information within the token database 122.

The generation of the second digital token 416 can include creating a new token entry that reflects the updated token data 412. This process ensures that the new token serves as a distinct reference for the corrected data, facilitating accurate tracking and management of the revised information. The second digital token 416 is assigned a unique identifier that differentiates it from any previous tokens and is integrated into the token database 122 to replace or supplement the original token data. The process of generating the second digital token may be the same or substantially similar to any process of generating a digital token discussed herein.

In an embodiment, the operations may further comprise transmitting the corrected set of data objects 408 to a user device 418. The corrected set of data objects 408 can be transmitted to a user device 418 through various communication channels tailored to the device's capabilities and the urgency of the information. This may include transmitting the corrected set of data objects 408 to the user device via text message, email, push notification, haptic alert, audio alert, and the like. The transmission may include a notification of the data error 404 and the correction to said error in the corrected set of data objects 408. A user device 418 may include a smartphone, laptop, tablet, desktop, or other computing device associated with the user.

Upon the identification of a data error 404 within the second set of data objects 124, system 400 may issue one or more notifications the user to facilitate timely resolution and maintain data integrity. The notification may include generating an alert that details the nature of the identified error, including the specific data objects affected and the nature of the discrepancy. This alert may be communicated through a user-friendly interface, such as an email notification, system dashboard message, or a dedicated error report. The notification may also provide actionable insights or recommendations for addressing the error, such as suggested corrective actions or further analysis requirements.

Figure 5:
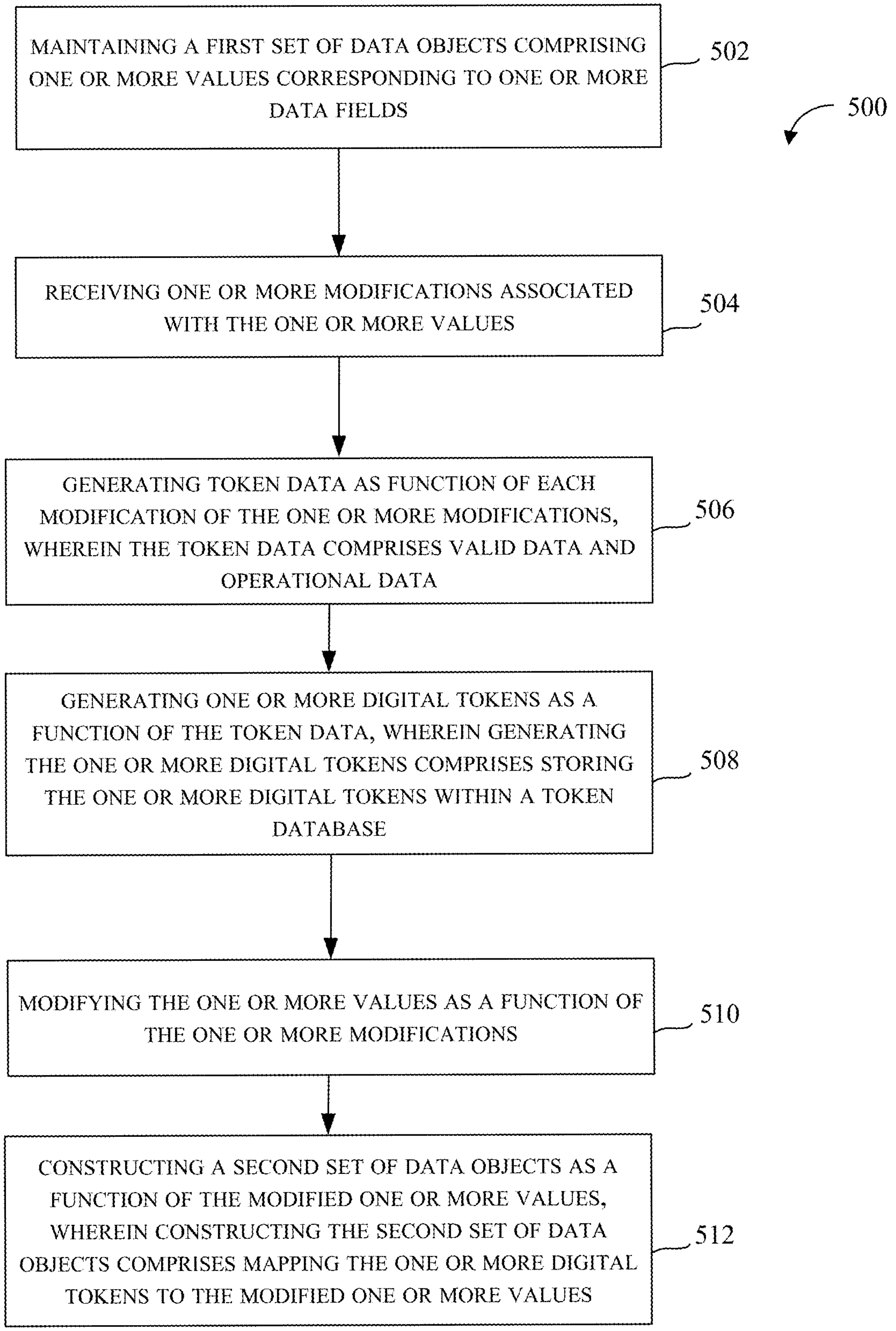
FIG. 5 is a flow diagram of an exemplary method for managing a plurality of data objects in a bitemporal manner in accordance with embodiments of the present disclosure.

Referring now to FIG. 5, a flow diagram of an exemplary method for managing a plurality of data objects in a bitemporal manner in accordance with embodiments of the present disclosure.

At step 502, the method includes maintaining, by a computing system operatively coupled to one or more processors, a first set of data objects comprising one or more values corresponding to one or more data fields.

At step 504, the method includes receiving, by the computing system, one or more modifications associated with the one or more values.

At step 506, the method includes generating, by the computing system, token data as a function of each modification of the one or more modifications, wherein the token data comprises valid data and operational data.

At step 508, the method includes generating, by the computing system, one or more digital tokens as a function of the token data, wherein generating the one or more digital tokens comprises storing the one or more digital tokens within a token database. In an embodiment, generating the one or more digital tokens may include: generating one or more cryptographic hashes based on the token data using a hashing algorithm; and generating the one or more digital tokens as a function of the one or more cryptographic hashes.

At step 510, the method includes modifying, by the computing system, the one or more values as a function of the one or more modifications.

At step 512, the method includes constructing, by the computing system, a second set of data objects as a function of the modified one or more values, wherein constructing the second set of data objects comprises mapping the one or more digital tokens to the modified one or more values.

In an embodiment, the method may further include receiving, by the computing system, a user query; selecting, by the computing system, at least one digital token from the token database as a function of the user query; and constructing, by the computing system, a third set of data objects as a function of the selection, wherein the third set of data objects comprises an alternate version of the one or more values. In some cases, constructing the third set of data objects may include forecasting the alternate version of the one or more values to a target date. The method may further include comparing, by the computing system, the second set of data objects and the third set of data objects; and generating, by the computing system, a bitemporal report as a function of the comparing.

In an additional embodiment, the method may further comprise receiving, by the computing system, a plurality of contextual data associated with the second set of data objects; and identifying, by the computing system, a data error within the second set of data objects as a function of the plurality of contextual data. The method may further comprise selecting, by the computing system, at least one digital token associated with the data error from the token database; constructing, by the computing system, a corrected set of data objects as a function of the selecting; updating, by the computing system, the token data as a function of the corrected set of data objects; generating, by the computing system, a second digital token as a function of the updated token data; and transmitting, by the computing system, the corrected set of data objects to a user device.

Further aspects of the invention are provided by one or more of the following embodiments.

Embodiment 1. A computing system for managing a plurality of data objects in a bitemporal manner, wherein the system comprises: one or more processors; and one or more non-transitory computer-readable media that collectively store instructions that, when executed by the one or more processors, cause the computing system to perform operations, the operations comprising: maintaining a first set of data objects comprising one or more values corresponding to one or more data fields; receiving one or more modifications associated with the one or more values; generating token data as function of each modification of the one or more modifications, wherein the token data comprises valid data and operational data; generating one or more digital tokens as a function of the token data, wherein generating the one or more digital tokens comprises storing the one or more digital tokens within a token database; modifying the one or more values as a function of the one or more modifications; and constructing a second set of data objects as a function of the modified one or more values, wherein constructing the second set of data objects comprises mapping the one or more digital tokens to the modified one or more values.

Embodiment 2. The system of embodiment 1, wherein the operations further comprise: receiving a user query; selecting at least one digital token from the token database as a function of the user query; and constructing a third set of data objects as a function of the selection, wherein the third set of data objects comprises an alternate version of the one or more values.

Embodiment 3. The system of embodiment 2, wherein constructing the third set of data objects comprises forecasting the alternate version of the one or more values to a target date.

Embodiment 4. The system of embodiment 3, wherein the operations further comprise: comparing the second set of data objects and the third set of data objects; and generating a bitemporal report as a function of the comparing.

Embodiment 5. The system of embodiment 1, wherein the operations further comprise: receiving a plurality of contextual data associated with the second set of data objects; and identifying a data error within the second set of data objects as a function of the plurality of contextual data.

Embodiment 6. The system of embodiment 5, wherein the operations further comprise: selecting at least one digital token associated with the data error from the token database; and constructing a corrected set of data objects as a function of the selection.

Embodiment 7. The system of embodiment 6, wherein the operations further comprise: updating the token data as a function of the corrected set of data objects; generating a second digital token as a function of the updated token data; and transmitting the corrected set of data objects to a user device.

Embodiment 8. The system of embodiment 1, wherein generating the one or more digital tokens comprises: generating one or more cryptographic hashes based on the token data using a hashing algorithm; and generating the one or more digital tokens as a function of the one or more cryptographic hashes.

Embodiment 9. A method for managing a plurality of data objects in a bitemporal manner, wherein the method comprises: maintaining, by a computing system operatively coupled to one or more processors, a first set of data objects comprising one or more values corresponding to one or more data fields; receiving, by the computing system, one or more modifications associated with the one or more values; generating, by the computing system, token data as function of each modification of the one or more modifications, wherein the token data comprises valid data and operational data; generating, by the computing system, one or more digital tokens as a function of the token data, wherein generating the one or more digital tokens comprises storing the one or more digital tokens within a token database; modifying, by the computing system, the one or more values as a function of the one or more modifications; and constructing, by the computing system, a second set of data objects as a function of the modified one or more values, wherein constructing the second set of data objects comprises mapping the one or more digital tokens to the modified one or more values.

Embodiment 10. The method of embodiment 9, wherein the method further comprises: receiving, by the computing system, a user query; selecting, by the computing system, at least one digital token from the token database as a function of the user query; and constructing, by the computing system, a third set of data objects as a function of the selection, wherein the third set of data objects comprises an alternate version of the one or more values.

Embodiment 11. The method of embodiment 10, wherein constructing the third set of data objects comprises forecasting the alternate version of the one or more values to a target date.

Embodiment 12. The method of embodiment 11, wherein the method further comprises: comparing, by the computing system, the second set of data objects and the third set of data objects; and generating, by the computing system, a bitemporal report as a function of the comparing.

Embodiment 13. The method of embodiment 9, wherein the method further comprises: receiving, by the computing system, a plurality of contextual data associated with the second set of data objects; and identifying, by the computing system, a data error within the second set of data objects as a function of the plurality of contextual data.

Embodiment 14. The method of embodiment 13, wherein the method further comprises: selecting, by the computing system, at least one digital token associated with the data error from the token database; constructing, by the computing system, a corrected set of data objects as a function of the selecting; updating, by the computing system, the token data as a function of the corrected set of data objects; generating, by the computing system, a second digital token as a function of the updated token data; and transmitting, by the computing system, the corrected set of data objects to a user device.

Embodiment 15. The method of embodiment 9, wherein generating the one or more digital tokens comprises: generating one or more cryptographic hashes based on the token data using a hashing algorithm; and generating the one or more digital tokens as a function of the one or more cryptographic hashes.

Embodiment 16. A computing system for managing a plurality of data objects in a bitemporal manner, wherein the system comprises: one or more processors; and one or more non-transitory computer-readable media that collectively store instructions that, when executed by the one or more processors, cause the computing system to perform operations, the operations comprising: maintaining, for an entity represented in an object graph, a first data object comprising a first plurality of key value pairs, each key value pair comprising a value for a key, and wherein a first set of dates is associated with the first data object, the first set of dates comprises valid view dates for the first data object; receiving one or more modifications associated with the one or more values of the first data object; generating a second data object for the entity represented in the graph as a function of the modified one or more values, the second data object comprising a second plurality of key value pairs, at least one of the key value pairs comprising a modified value that has been modified according to the one or more modifications, and wherein a second set of dates is associated with the second data object, the second set of dates comprises second valid view dates for the second data object, the second set of dates being non-overlapping with the first set of dates.

Embodiment 17. The system of embodiment 16, wherein the one or more modifications comprise modifications that are incapable of being performed with an append-only operation.

Embodiment 18. The system of embodiment 16, wherein the one or more modifications comprise retroactively dated modifications.

Embodiment 19. The system of embodiment 16, wherein the one or more modifications comprise future-dated modifications that occur prior to an existing future-dated modification that exists within the first data object.

Embodiment 20. The system of claim 16, wherein the operations further comprise: comparing the first data object to the second data object to identify one or more differences; and determining a corrective data output based on the one or more differences.

Reference is made herein in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present), and B is false (or not present), A is false (or not present), and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counterclockwise.

As used in this disclosure, the term "function" refers to a situation where one piece of data or one variable determines the value of another. For example, if a second data point is generated as a function of a first data point, it means that the value of the second data point is computed based on the value of the first data point through a specific algorithm or process. This relationship can be represented mathematically or programmatically, where a function takes the first data point as input and produces the second data point as output, thereby establishing a direct dependency between them.

Benefits, other advantages, and solutions to problems are described herein with regard to specific embodiments. However, the benefits, advantages, solutions to problems, and any feature(s) that may cause any benefit, advantage, or solution to occur or become more pronounced are not to be construed as a critical, required, or essential feature of any or all the claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A computing system for managing a plurality of data objects in a bitemporal manner, wherein the system comprises:

one or more processors; and one or more non-transitory computer-readable media that collectively store instructions that, when executed by the one or more processors, cause the computing system to perform operations, the operations comprising:

maintaining a first set of data objects comprising one or more values corresponding to one or more data fields;

receiving one or more modifications associated with the one or more values;

generating token data as a function of each modification of the one or more modifications, wherein the token data comprises valid data and operational data;

generating one or more digital tokens as a function of the token data, wherein generating the one or more digital tokens comprises storing the one or more digital tokens within a token database;

modifying the one or more values as a function of the one or more modifications;

constructing a second set of data objects as a function of the modified one or more values, wherein constructing the second set of data objects comprises mapping the one or more digital tokens to the modified one or more values;

receiving a user query;

selecting at least one digital token from the token database as a function of the user query; and constructing a third set of data objects as a function of the selection, wherein the third set of data objects comprises an alternate version of the one or more values.

2. The system of claim 1, wherein constructing the third set of data objects comprises forecasting the alternate version of the one or more values to a target date.

3. The system of claim 2, wherein the operations further comprise:

comparing the second set of data objects and the third set of data objects; and generating a bitemporal report as a function of the comparing.

4. The system of claim 1, wherein constructing the third set of data objects comprises constructing an alternate bitemporal timeline associated with the alternate version of the one or more values.

5. The system of claim 1, wherein the operations further comprise:

receiving a plurality of contextual data associated with the second set of data objects; and identifying a data error within the second set of data objects as a function of the plurality of contextual data.

6. The system of claim 5, wherein:

selecting the at least one digital token comprises selecting the at least one digital token as a function of the data error; and constructing the third set of data objects comprises constructing a corrected set of data objects as a function of the selecting.

7. The system of claim 1, wherein the operations further comprise:

updating the token data as a function of the third set of data objects;

generating a second digital token as a function of the updated token data; and transmitting the third set of data objects to a user device.

8. The system of claim 1, wherein generating the one or more digital tokens comprises:

generating one or more cryptographic hashes based on the token data using a hashing algorithm; and generating the one or more digital tokens as a function of the one or more cryptographic hashes.

9. A method for managing a plurality of data objects in a bitemporal manner, wherein the method comprises:

maintaining, by a computing system operatively coupled to one or more processors, a first set of data objects comprising one or more values corresponding to one or more data fields;

receiving, by the computing system, one or more modifications associated with the one or more values;

generating, by the computing system, token data as function of each modification of the one or more modifications, wherein the token data comprises valid data and operational data;

generating, by the computing system, one or more digital tokens as a function of the token data, wherein generating the one or more digital tokens comprises storing the one or more digital tokens within a token database;

modifying, by the computing system, the one or more values as a function of the one or more modifications;

constructing, by the computing system, a second set of data objects as a function of the modified one or more values, wherein constructing the second set of data objects comprises mapping the one or more digital tokens to the modified one or more values;

receiving, by the computing system, a user query;

selecting, by the computing system, at least one digital token from the token database as a function of the user query; and constructing, by the computing system, a third set of data objects as a function of the selection, wherein the third set of data objects comprises an alternate version of the one or more values.

10. The method of claim 9, wherein constructing the third set of data objects comprises forecasting the alternate version of the one or more values to a target date.

11. The method of claim 10, wherein the method further comprises:

comparing, by the computing system, the second set of data objects and the third set of data objects; and generating, by the computing system, a bitemporal report as a function of the comparing.

12. The method of claim 9, wherein the method further comprises:

receiving, by the computing system, a plurality of contextual data associated with the second set of data objects; and identifying, by the computing system, a data error within the second set of data objects as a function of the plurality of contextual data.

13. The method of claim 12, wherein:

selecting the at least one digital token comprises selecting the at least one digital token as a function of the data error; and constructing the third set of data objects comprises constructing a corrected set of data objects as a function of the selecting.

14. The method of claim 9, wherein the method further comprises:

updating, by the computing system, the token data as a function of the third set of data objects;

generating, by the computing system, a second digital token as a function of the updated token data; and transmitting, by the computing system, the third set of data objects to a user device.

15. The method of claim 9, wherein generating the one or more digital tokens comprises:

generating one or more cryptographic hashes based on the token data using a hashing algorithm; and generating the one or more digital tokens as a function of the one or more cryptographic hashes.

16. A computing system for managing a plurality of data objects in a bitemporal manner, wherein the system comprises:

one or more processors; and one or more non-transitory computer-readable media that collectively store instructions that, when executed by the one or more processors, cause the computing system to perform operations, the operations comprising:

maintaining, for an entity represented in an object graph, a first data object comprising a first plurality of key value pairs, each key value pair comprising a value for a key, and wherein a first set of dates is associated with the first data object, the first set of dates comprises valid view dates for the first data object;

receiving one or more modifications associated with the one or more values of the first data object;

generating a second data object for the entity represented in the graph as a function of the modified one or more values, the second data object comprising a second plurality of key value pairs, at least one of the key value pairs comprising a modified value that has been modified according to the one or more modifications, and wherein a second set of dates is associated with the second data object, the second set of dates comprises second valid view dates for the second data object, the second set of dates being non-overlapping with the first set of dates;

receiving a user query;

generating a third set of data objects as a function of the user query, wherein the third set of data objects comprises an alternate version of the modified one or more values.

17. The system of claim 16, wherein the one or more modifications comprise modifications that are incapable of being performed with an append-only operation.

18. The system of claim 16, wherein the one or more modifications comprise retroactively dated modifications.

19. The system of claim 16, wherein the one or more modifications comprise future-dated modifications that occur prior to an existing future-dated modification that exists within the first data object.

20. The system of claim 16, wherein the operations further comprise:

comparing the first data object to the second data object to identify one or more differences; and determining a corrective data output based on the one or more differences.

* * * * *